US006196274B1

(12) United States Patent
Duncan

(10) Patent No.: US 6,196,274 B1
(45) Date of Patent: Mar. 6, 2001

(54) WASTE DISPOSAL SYSTEM

(75) Inventor: Ricky D. Duncan, Erlanger, KY (US)

(73) Assignee: Airworld Tech Corporation, Villa Hills, KY (US)

( * ) Notice: Subject to any disclaimer, the term of this patent is extended or adjusted under 35 U.S.C. 154(b) by 0 days.

(21) Appl. No.: 09/425,525

(22) Filed: Oct. 22, 1999

(51) Int. Cl.[7] .................................................. E03D 1/00
(52) U.S. Cl. ................................ 141/1; 141/86; 141/97; 141/285; 141/383; 588/249; 588/259; 4/321
(58) Field of Search ...................... 4/321–323; 141/1, 141/86, 87, 97, 279, 285, 383, 387, 388, 389; 137/312–314; 588/249, 259

(56) References Cited

U.S. PATENT DOCUMENTS

| 3,570,503 | 3/1971 | DeBoliac | 134/58 |
|---|---|---|---|
| 3,858,418 | 1/1975 | Butler | 68/235 D |
| 3,874,478 | 4/1975 | Mantell, Jr. | 184/1.5 |
| 4,114,203 | * 9/1978 | Carolan | 4/323 |
| 4,550,453 | 11/1985 | Norman | 4/323 |
| 4,612,916 | 9/1986 | Akers et al. | 128/1 R |
| 4,626,291 | 12/1986 | Natale | 134/21 |
| 4,695,088 | 9/1987 | Jensen | 296/38 |
| 4,820,000 | 4/1989 | Jacobson | 312/1 |
| 4,911,191 | 3/1990 | Bain | 134/200 |
| 5,017,197 | 5/1991 | McGuire et al. | 55/1 |
| 5,080,701 | 1/1992 | Howard et al. | 55/356 |
| 5,121,776 | 6/1992 | Kovach | 141/98 |
| 5,262,578 | * 11/1993 | Hall | 588/249 |
| 5,379,810 | 1/1995 | Marino | 141/10 |
| 5,890,226 | 4/1999 | Snedeker et al. | 2/97 |
| 5,960,907 | * 10/1999 | Chau | 141/97 |

OTHER PUBLICATIONS

*Lavatory Drain Coupling*, Kaiser Electroprecision.
*Portable Water Fill Coupling*, Kaiser Electroprecision.

* cited by examiner

Primary Examiner—J. Casimer Jacyna
(74) Attorney, Agent, or Firm—Wood, Herron & Evans, L.L.P.

(57) ABSTRACT

The present invention provides a waste disposal system through the use of a flexible bag 14 with glove members 20, 22, a drain line tube 32, and a refill tube 48 in order to service aircraft lavatories. Through the use of the bag 14 the ramp attendant, the aircraft ramp, baggage and other property on the ramp is protected from contamination with human waste and chemical solutions used to deodorize and sanitize aircraft lavatories.

19 Claims, 2 Drawing Sheets

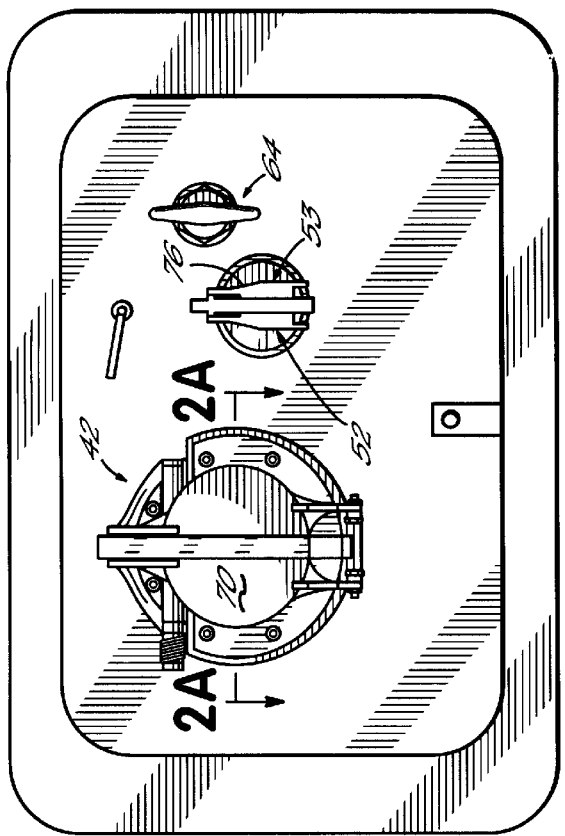
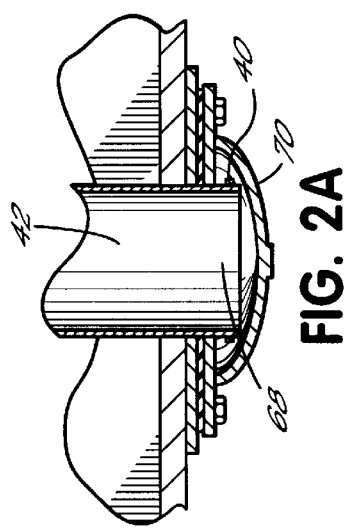
FIG. 2A
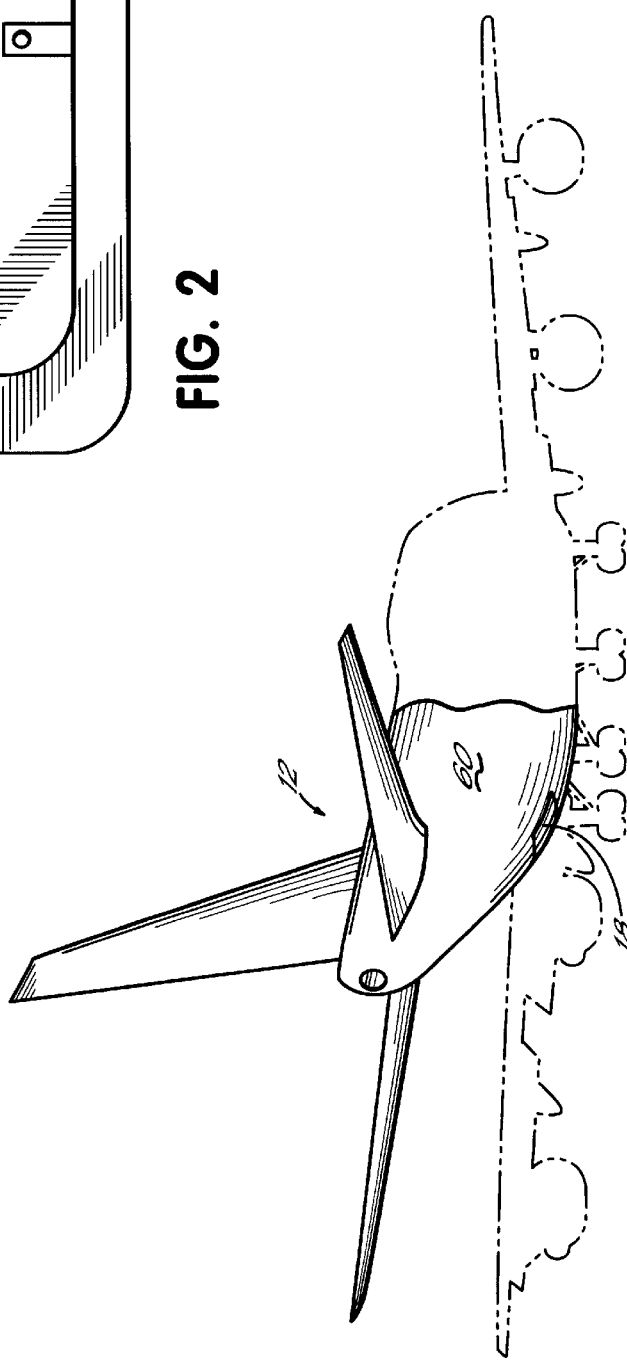
FIG. 2
FIG. 1

WASTE DISPOSAL SYSTEM

FIELD OF THE INVENTION

The present invention relates generally to an apparatus and method for the disposal of waste from an aircraft and replenishment of sanitary chemical solutions to the aircraft during servicing of an aircraft lavatory.

BACKGROUND OF THE INVENTION

Presently, the removal of human waste and replenishing of lavatory solutions during the servicing of an aircraft is a manual operation. A ramp attendant uses a system of hoses, couplings and storage tanks to drain human waste, including fecal matter, from the aircraft lavatory and to refill the lavatory with a chemical solution, referred to as "blue solution." The blue solution used to fill the storage tanks of the aircraft lavatory generally includes water, perfumes and/or other chemical ingredients that reduce the smell of the human waste. An example of such a mixture is formaldehyde and methanol, which neutralizes the harmful effects of the human waste.

Human waste, whether combined with perfumes or the chemicals used as components of the blue solution, is a hazardous material. Additionally, the blue solution itself is a hazardous material. As such, any contact of human waste or blue solution with human persons, their clothing and other property should be avoided. However, resulting from the apparatus and method due to the consequent lack of protection currently used for servicing aircraft lavatories, there exists the potential for the blue solution and human waste to spill onto the attendant or tarmac during servicing of the aircraft. This spillage may also come into contact with other persons in the vicinity of the aircraft lavatory or with property, such as baggage, which may be associated with the aircraft. Additionally, persons and property may come into contact with blue solution or human waste remaining on an airport tarmac following servicing of an aircraft. Thus, there are significant risks, not the least which are health hazards, for anyone whose person or property contacts the blue solution or human waste.

Regarding the method currently used to service an aircraft lavatory, an attendant places a service cart/truck in proximity to an access panel for the aircraft lavatory. The service cart/truck includes storage tanks that waste will be deposited to and blue solution will be pumped from. The access panel is generally located underneath or on the side of the aircraft. This access panel is usually secured with thumb snaps, which are compressed, allowing the door to open upon release. Following the placement of the service cart/truck, the ramp attendant, wearing latex gloves as a precautionary measure, opens the access panel. Tubing associated with storage tanks of the aircraft lavatory is accessible behind the access panel. Valves are operatively connected to these tubes to effect their opening and closing. The tube and valve system of the aircraft includes a rinse/refill tube having a male flange, a waste tube having a male flange, and a T-handle. By manipulating T-handle, all waste debris inside the holding tank of the aircraft lavatory is released and thus emptied from the aircraft through the waste tube. This waste flows to the storage tank of the service cart/truck through a drain line tube which has been connected to the waste tube of the aircraft. The service cart/truck also includes a refill tube which associates with the rinse/refill tube of the aircraft. These tubes are used to replenish the aircraft lavatory with blue solution once the waste has been discharged.

Generally, upon opening the access panel, a stream of blue solution, which almost always contains human waste, falls out of the drainage pipes in the aircraft. Often, this mixture contacts the hands and clothing of the attendant, the cart/truck and the tarmac underneath the aircraft. Depending on the type and design of the aircraft, any such contamination may spread to the cargo and baggage area near the lavatory system. If wind is blowing during servicing of the aircraft, the potential for spreading of hazardous materials increases significantly.

Following the opening of the access panel, a cap closing off the waste tube is opened. Waste drainage and/or tissue debris is located in the waste tube beyond this cap, as the contents of the lavatory holding tank drain to the lowest point. As in the case of the blue solution, this waste drainage also falls and may contact the attendant's hands, unless the ramp attendant dangerously and quickly releases the handle of the waste cap and steps blindly backwards to avoid the drainage. Such motion could result in accident and/or injury to the attendant and/or others. Occasionally, the waste release valve may have inadvertently been left open or may have opened accidentally during travel, and the waste therein streams out when the ramp attendant opens the cap of the waste tube. This results in a substantial amount of waste debris falling out of the aircraft.

After the initial flow of waste matter has stopped, the attendant will attach the waste coupling on the drain line tube extending from the cart/truck to the aircraft by rotating the head, thereby locking the coupling in place. After locking the waste coupling in place, the attendant releases the waste stored in the lavatory holding tank in order that it may flow into the drain line tube of the now attached waste disposal system. During this flow, human waste and blue solution may leak from the junction of the couplings, the drain line tube and waste tube. Any such leakage causes the exterior of the tubing and coupling to become contaminated. Additionally, this drain line tube lies on top of the service cart/truck, further exposing the entire cart/truck to waste fecal debris. Additionally, any attendant in proximity to the drainage process may come into contact with this waste leakage. The waste debris may further fall to the airport tarmac.

Once the waste has flowed into the drain line tube, the tube must be snaked or angled so the waste will be deposited into the storage tanks of the service cart/truck. As the couplings get more use, the bearings and rings start to wear. As a result, any rotation of the head causes leakage of waste debris. Also the drain line tube generally includes metal wire woven inside. This results in holes and tears in the drain line tube leading to the cart/truck, causing drips and runs as the waste is deposited into the cart/truck.

After the waste is deposited into the cart/truck, the ramp attendant disconnects the waste coupling and steps back quickly and returns the drain line tube and coupling to the cart/truck. The attendant waits until the remaining drips of waste have stopped and then locks the waste cap back in place. This leakage may also result in the contamination of persons and property.

After all waste has been drained from the aircraft, the ramp attendant connects the coupling of the refill tube to the rinse/refill flange of the aircraft and locks it into place in a manner similar to the waste coupling. The attendant walks to the cart/truck and turns on a switch on a pump to refill the lavatory with the blue solution. The amount of blue solution used will vary by aircraft, but can amount up to 25 gallons. Following refill, the attendant stops the pump and unlocks the fill coupling from the aircraft, and, as in the case of the waste drainage, blindly and in a backward motion tries to escape being hit with the refill blue solution as it drains back out of the aircraft. After the backwash flow of the blue solution is emptied onto the tarmac with the attendant hazards of contacting persons and/or property, the agent places the refill tube back onto the cart/truck and locks the cap back onto the rinse/refill tube of the aircraft.

The ramp attendant finally closes the lavatory access panel, and removes the latex gloves and pulls away to the next aircraft. As the ramp attendant pulls away, there is human waste and blue solution left behind on the tarmac and on the cart/truck, as well as on the clothes of the attendant. Waste debris may also remain on the cargo and baggage near the aircraft, and on other persons such as airport personnel. Any waste or blue solution on the tarmac may remain until it rains or the material evaporates.

As can be seen from the above discussion, the current method of servicing aircraft lavatory systems results in the deleterious spread of human waste, such as urine and fecal material, along with blue solution to humans and property. Contact with such hazardous material could potentially have several harmful effects. Thus, it would be desirable to have a system for servicing aircraft lavatories with minimal splashing of human waste onto ramp attendants, property and the tarmac of airports. Additionally, it would be desirable to have a system which minimizes contact of blue solution with attendants, property and the tarmac. Finally, it would be desirable to have a system which would not subject the environment to risks of hazardous materials.

SUMMARY OF THE INVENTION

The apparatus and method for servicing an aircraft lavatory of the present invention solves the problems and eliminates the drawbacks of current methods of servicing aircraft lavatories as developed in the background of the invention. The apparatus used in the present invention surrounds a defined workspace in order to facilitate the disposal of the waste while preventing the waste from contacting persons and property outside the workspace. In particular, the apparatus includes a flexible bag which, in use, is placed over the access panel of the aircraft in order to catch any waste debris or blue solution that may fall from the holding tank tubes. The apparatus also includes first and second orifices disposed in the bag. Gloves are attached to these openings whereby a ramp attendant can place his/her hands into the gloves in order to service the aircraft lavatory within the workspace defined by the bag. Also located to the interior of the bag is a drain line tube. A refill tube from a service cart/truck may be disposed in the interior of the bag by extending it through a refill tube port disposed in the bag. Each of these tubes passes through an opening in the bag and are connected to the waste and refill tanks of a service cart/truck. The drain line tube and the refill tube include female couplings which are compatible with male couplings located within the interior of the aircraft. A refill switch is connected to the refill tube and operates a pump in order to replenish the aircraft lavatory with blue solution. The opening in the bottom of the bag is heat sealed around the drain line tube. Several drain port holes are disposed in the drain line tube in proximity to the base of the bag so that any waste material which falls into the bag will thereafter be drained into the drain line tube by way of these port holes to be subsequently deposited into the waste storage tank on the service cart/truck. In addition to a waste storage tank, the service cart/truck includes a storage tank for blue solution which is connected to the refill tube.

The bag member used in the apparatus is a protective heat sealed bag and includes a transparent face shield along with the continuous drain line tube and refill tube that extend from the waste coupling to the storage tank of the service cart/truck. The bag forms a trap, which catches any falling waste debris and/or blue solution from the open waste and refill flanges of the aircraft during servicing of the aircraft lavatory.

In use, the attendant puts on a pair of latex gloves and positions the service cart/truck near the lavatory access panel located on the fuselage of the aircraft. As a result, the tanks are placed in close proximity to the access panel of the aircraft in order to reduce wear on other components of the waste disposal apparatus, thereby reducing leakage of waste material and blue solution.

Following the positioning of the cart/truck, the attendant opens the access panel exposing the waste flange, refill flange and T-handle. The attendant then places his/her hands in the gloves attached to the bag and positions the open top of the bag against the aircraft and surrounding the exposed flanges and T-handle. The attendant opens the cap of the waste flange, thereby allowing all waste debris to fall into the trap created by the positioning of the bag. The attendant couples the drain line tube to the waste flange, then pulls the T-handle so that waste will drain through the drain line tube and into the waste storage tank of the service cart/truck. The waste debris which has fallen into the bag will proceed to the lowest point of the bag which is heat sealed against the drain line tube extending from the interior of the bag to the service cart/truck. The portion of the drain line tube to which the interior of the bag is sealed contains drain port holes whereby waste will drain from the interior of the bag into the drain line tube. Thus the problem of contamination of persons and property with waste matter is greatly reduced.

Following the drainage of waste, the attendant disconnects the waste coupling allowing it to fall into the bag and closes the waste flange cap. The attendant then attaches the refill coupling of the refill tube which has been extended through the refill tube port to the rinse/refill flange located within the aircraft. The switch to operate the refill pump is connected to the bag for convenience so the attendant does not need to lower the bag and remove his/her hands from the gloves, which would increase the chances of contamination. The attendant then fills the storage tank of the aircraft lavatory with blue solution and following filling disconnects the refill coupling from the flange, allowing all spillage and backwash of blue solution to fall into the trap, into the waste tube and into the tank in one motion.

Because the bag is sealed and the gloves are sealed to the bag, there is a very small likelihood that liquid or small debris can escape the bag. This keeps the human fecal debris and blue solution from contacting the tarmac, the attendant, the baggage, the cargo and other property. Likewise the falling debris is not susceptible to spread from wind. Following drainage of all waste into the cart/truck the attendant places the bag into the cart/truck and returns to the aircraft and closes the lavatory access panel. As the attendant pulls the cart/truck away there is no evident sign that the lavatory has been serviced, due to the fact that there is minimal or no liquid or solid debris on the ramp, the tarmac, or attendant.

BRIEF DESCRIPTION OF THE DRAWINGS

FIG. 1 is an environmental view of the access panel of a lavatory tank located on the fuselage of an aircraft;

FIG. 2 is a perspective view of the tubing system of an aircraft lavatory showing a waste tube with a hinged valve cover, a refill line tube, and a T-handle for opening the valve of the waste tube and refill tube;

FIG. 2A is a cross-sectional view of the waste tube of an aircraft lavatory taken along lines 2A—2A of FIG. 2.

DETAILED DESCRIPTION

Figure 3:
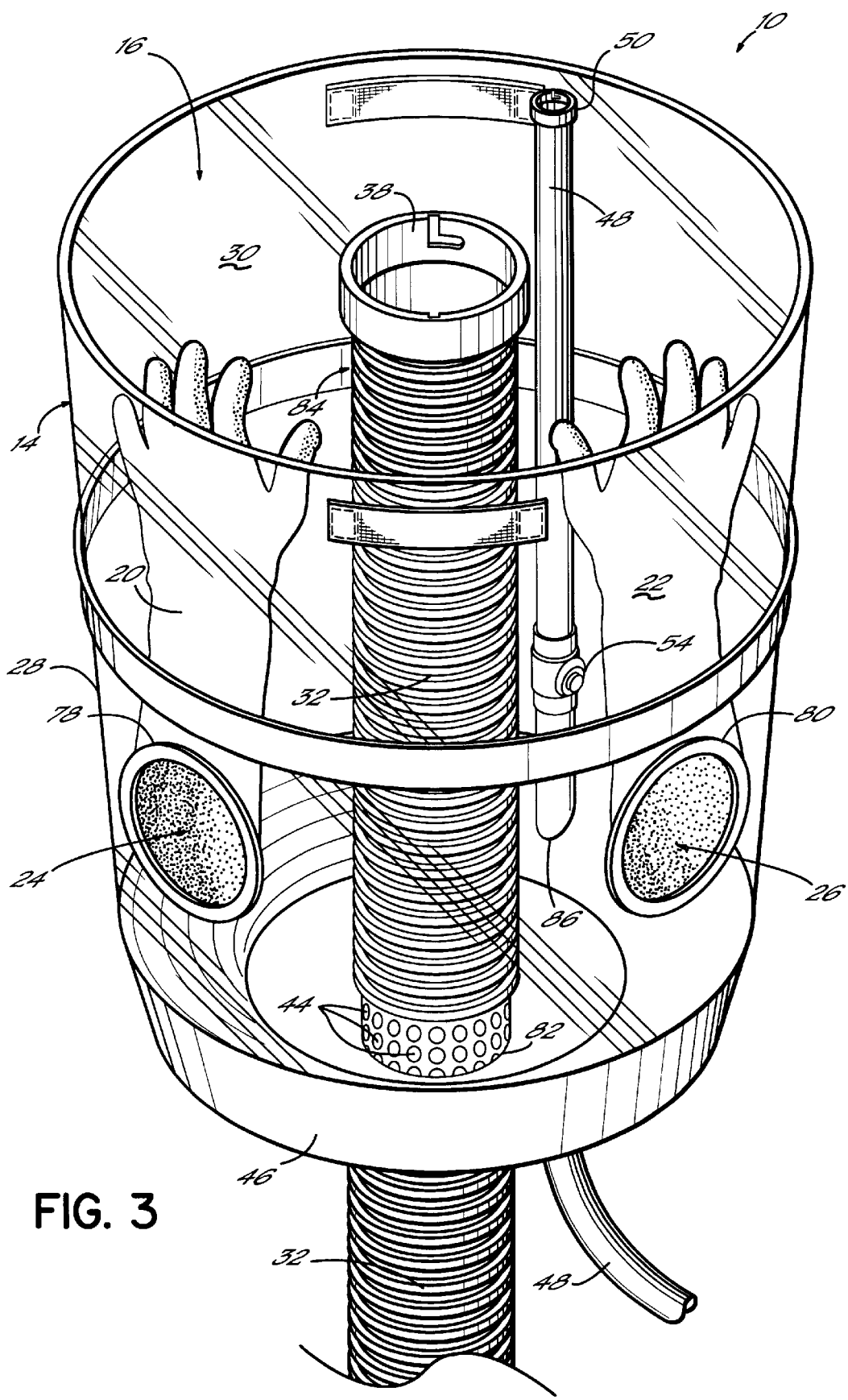
FIG. 3 is a perspective view of the waste disposal apparatus of the present invention depicting a bag including orifices having attached glove members, a drain line tube having drain port holes in proximity to the base of the bag and a refill tube having a switch to activate a pump.

Referring to FIGS. 1–3, the apparatus 10 of the present invention provides a containment mechanism for trapping human waste, such as fecal debris and the like, and blue solution located in a lavatory storage tank (not shown) of an aircraft 12 or other transportation (i.e., buses, trains, etc.), thereby preventing contact of waste and blue solution with persons and/or property. Particularly referring to FIG. 3, the apparatus 10 for waste disposal includes a bag 14 of flexible material which is substantially impermeable to human waste and blue solution. The bag 14 includes an open top 16 adapted to be placed in proximity to an access panel 18 of the tanks of an aircraft lavatory for the servicing thereof. Additionally, the apparatus 10 of the present invention includes glove members 20, 22 attached to openings 24, 26 disposed within the sidewall 28 of the bag 14. These glove members 20, 22 extend within the workspace 30 defined by the interior of the bag 14. The glove members 20, 22 are adapted for providing protected access to the interior of the bag 14 for the hand and arm of a user. The present invention also includes a drain line tube 32 which is disposed on both the interior and exterior of the bag 14. The portion of the drain line tube exterior to the bag 14 is operatively connected to a waste storage tank (not shown) on a service cart/truck (not shown). This drain line tube 32 includes a coupling 38 which is compatible with a flange 40 on a waste tube 42 located behind the access panel 18 of the aircraft 12. Further, the drain line tube 32 includes port holes 44 in proximity to the base 46 of the bag 14 in order that fecal material and other waste debris trapped within the interior of the bag 14 will flow back into the drain line tube 32 and be subsequently disposed of. The apparatus 10 of the present invention also includes a refill tube port 86 disposed within the sidewall 28 of the bag 14. This port 86 allows for a refill tube 48 to be extended through the port 86 and into the workspace defined by the enclosure of the bag 14. The refill tube 48 includes a coupling 50 that is compatible with a flange 52 of a rinse/refill tube 53 located behind the access panel 18 of the aircraft 12. The refill tube 48 further includes a refill line switch 54 operatively connected to a pump (not shown) used to force blue solution through the refill tube 48.

Referring now to FIG. 1, an access panel 18 for servicing a lavatory is depicted on the fuselage 60 of an aircraft 12. This access panel 18 may be located underneath the fuselage 60 or on the side of the fuselage 60. Referring to FIG. 2, the system of tubes and valves used in lavatory service is depicted. The tubes are exposed upon opening the access panel 18. These include a waste tube 42, a rinse/refill tube 53 and a T-handle 64. The waste tube 42 includes a distal end (not shown) and a proximal end 68. The distal end is operatively connected to the waste holding tank (not shown) of the aircraft lavatory. The proximal end 68 is disposed in the vicinity of the access panel 18 and includes a male flange 40 at the terminus of its proximal end 68. This flange 40 and the opening of the proximal end 68 of the waste tube 42 are covered by a waste tube cap 70 to close off the opening of the waste tube 42.

Like the waste tube 42, the rinse/refill tube 62 includes a distal end (not shown) and a proximal end 74. The distal end is operatively connected to the blue solution holding tank (not shown) of the aircraft lavatory. The proximal end 74 is disposed in the vicinity of the access panel 18 and includes a male flange 52 at the terminus of its proximal end. This flange 52 and the opening of the proximal end 74 of the rinse/refill tube 62 are covered by a rinse/refill tube cap 76 to close off the tube opening.

The T-handle 64 is operatively connected to a valve of the waste tube 42 and holding tank. When manipulated, the T-handle 64 causes the valve to open, thereby allowing the discharge of stored waste from the holding tank of the lavatory and out through the waste tube 42.

Referring now to FIG. 3, the bag 14 and tubing system of the present invention is shown. A major portion of the bag 14 is substantially transparent so that a user having his/her hands inserted into the glove members 20, 22 can view through the workspace of the bag 14 to the area of the access panel 18 being worked upon from outside the bag 14. The bag 14 thus forms a splash shield to protect the face of the attendant while using the bag 14. In the illustrated embodiment, the bag 14 is formed of a transparent, flexible sheet plastic which is substantially impermeable to waste debris such as fecal material and blue solutions. However, any flexible material which is substantially impermeable to human waste debris and blue solution may be used.

The base 46 of the bag 14 is disposed opposite the open top 16 and forms a spill trap to which any waste material or blue solution within the bag 14 ultimately drains due to the force of gravity. The spill trap formed by the bag 14 in the illustrated embodiment has an elliptical shape with a diameter in the range of about 6 inches to 10 inches and a depth in the range of about 3 inches to 6 inches. The flexible transparent and elliptical shaped splash shield, forming the upper part of the bag 14, has a major axis in the range of about 14 inches to 18 inches and a minor axis in the range of approximately 10 inches to 14 inches. This size bag 14 is sufficient to completely encompass the necessary work area on most aircraft 12. However, the size of the bag 14 can be altered to fit other aircraft 12 or other modes of transportation (i.e., buses, trains, etc.). The bag 14 traps waste material and blue solution which does not flow directly into the drain line tube 32 and allows that waste material to drain through the port holes 44 on the drain line tube 32 inside the bag 14 to subsequently be deposited in the waste storage tank of the service cart/truck. The rear of the splash shield is clear and contoured to fit up to the fuselage 60 of an aircraft 12. The rear is higher than the front of the splash shield to prevent splashing on the user's face due to any wind which may be in proximity to the aircraft 12.

The glove members 20, 22 in the illustrated embodiment of the present invention are provided in the form of a pair of flexible gloves 20, 22 sealed at their cuffs 78, 80 to first and second orifices 24, 26 in the sidewall 28 of the bag 14. The gloves 20, 22 are positioned to accommodate both hands of the user in a comfortable position for working on the area of the lavatory beyond the access panel 18 which is isolated by the bag 14. In the illustrated embodiment of the invention, the material of the gloves 20, 22 is a thin, flexible plastic, although it should be apparent that other conventional glove materials substantially impermeable to human waste debris and blue solution can be used. The first and second orifices 24, 26 to which are attached the pair of protective gloves 20, 22 are located in the rear of the body of the bag 14. Each glove 20, 22 is attached to its respective orifice 24, 26 by means of heat, sewing or snap rings. The gloves 20, 22 allow the user to touch all connection couplings 38, 50 inside the bag 14 while maintaining a clean operation. The gloves 20, 22 are sized so that one size may fit all persons.

As may be best seen in FIG. 3 of the drawings, the apparatus 10 of the present invention further includes a drain line tube 32 which extends from the interior of the bag 14 to the exterior of the bag 14 by passing through an opening 82 located in the base 46 of the bag 14. In the illustrated embodiment, this drain line tube 32 is formed of a flexible material, in order that the user may easily manipulate drain line tube 32 within the bag 34 to make connection with the waste tube 42. Opening 82 is disposed substantially opposite the open top 16 of the bag 14. In the illustrated embodiment, the opening 82 is sized to match the circumference of the drain line tube 32. The bag 14 is sealed at the opening 82 in its bottom to and around the circumference of the drain line tube 32 by heat. In alternate embodiments, this material of the bag 14 around opening 82 may be sewn or snapped in order to facilitate attachment. The bottom of the bag 14 tapers towards its center in order to allow a free flow of waste materials to the port holes 44 of the drain line tube 32.

The proximal end 84 of the drain line tube 32 includes a female coupling 38 which attaches to a corresponding male flange 40 on the proximal end 68 of the waste tube 42. Following this connection, the drain line tube 32 is used to transport human waste debris from the aircraft 12 to a waste storage tank 34 on the service cart/truck 36. In the illustrated embodiment, this drain line tube 32 is generally of a round shape having a diameter in the range of approximately 4 to 4½ inches. The length of the drain line tube 32 extends throughout the bag 14 and extends to the waste tank. The length of the tube 32 will vary depending on the style of cart/truck used and, therefore, its potential distance from the aircraft 12. However, the length of the drain line tube 32 from the female coupling 38 on its proximal end 84 to the drain port holes 44 will generally range from about 16 inches to 20 inches.

The drain port holes 44 are located in the vicinity of the base 46 of the bag 14 and are disposed through the drain line tube 32 within the interior workspace 30 of the bag 14. These port holes 44 are predrilled during fabrication of the bag 14 and, in the illustrated embodiment, are approximately ¼ of an inch in diameter and are positioned in rows of 6 to 10 drain port holes 44 spaced approximately 1 inch apart around the circumference of the drain line tube 32. In the illustrated embodiment, the drain line tube 32 is comprised of a flexible material such as plastic and can form a straight, 45, or 90° angle toward the waste storage tank of the service cart/truck. Thus, the flexibility of the drain line tube 32 allows for its positioning to enhance the efficiency of deposition of waste material into the storage tank.

The bag 14 further includes a refill tube port 86 disposed in its sidewall 28. This port 86 allows a refill tube 48, as may be found on any service cart/truck, to be disposed through the interior of the bag 14 by extending though port 86. In the illustrated embodiment, this refill tube 48 is formed from a flexible material, in order that a user may easily manipulate the refill tube 48 for connection to the rinse/refill tube 53. In the illustrated embodiment, the port 86 is sized to match the circumference of the refill tube 48. The refill tube port 48 is not an integral part of the apparatus 10, but may be disposed through port 86 and into bag 14 in order that bag 14 may catch any blue solution which falls from access panel during replenishment of aircraft storage tanks. In an alternative embodiment, the bag 14 is sealed at the port 86 in its bottom to and around the circumference of the refill tube 48 by heat. In this embodiment, refill tube 48 may be an integral part of apparatus 10. In other alternate embodiments, this material of the bag 14 around the opening 82 may be sewn or snapped in order to facilitate the attachment.

The proximal end 88 of the refill tube 48 includes a female coupling 50 which attaches to a corresponding male flange 52 on the proximal end 74 of the rinse/refill tube 53. Following this connection, the refill tube 48 is used to transport blue solution from the holding tanks of the service cart/truck to the aircraft 12. In the illustrated embodiment, this refill tube 48 is generally of a round shape having a diameter in the range of approximately 1 inch to 1½ inches. The length of the refill tube 48 extends throughout the bag 14 and extends to the holding tank of the service cart/truck. The length of the tube 48 will vary depending on the style of cart/truck used and, therefore, its potential distance from the aircraft 12. However, the length of the refill tube 48 from the female coupling 50 on the proximal end 88 to the base 46 of the bag 14 will generally range from about 16 inches to about 20 inches.

Additionally, the refill tube 48 also includes a refill tube switch 54 or valve which may be operatively connected to a pump in order to activate the pump to discharge blue solution from the storage tank on the cart/truck through the refill tube 48 and into the lavatory of the aircraft 12 following removal of human waste. Upon activation, the lavatory of the aircraft 12 is refilled with blue solution. In the illustrated embodiment, refill tube switch 54 is an automatic switch. However, it will be appreciated that in alternate embodiments of the invention, switch 54 may be a manual switch. The switch 54 may be in the form of a button, toggle, marine-type or other waterproof switch 54 disposed within the interior of the bag. Alternatively, the switch 54 may be disposed on the exterior of the bag or may be located on a foot pedal easily accessible to the user during refilling of aircraft storage tanks with blue solution. In yet another alternative embodiment, the switch 54 may be operatively connected to the interior of the bag and have a wire, such as an electrical wire, adapted to connect with a second wire extending from the pump. The connection between pump wire and switch wire may occur at the bag interface in order to operatively connect the switch 54 to pump. The location of the switch 54 inside bag 14 prevents the user from having to remove his/her hands from the workspace to activate a switch on the cart/truck.

In use a ramp attendant places his/her hands in the gloves 20, 22 attached to the bag 14 and positions the open top 16 of the bag 14 against the aircraft 12 so as to surround the exposed waste tube 42, rinse/refill tube 53, and T-handle 64. The attendant then opens the cap 70 of the waste tube 42, thereby allowing all waste debris to fall into the trap created by the positioning of the bag 14. The attendant then couples the drain line tube 32 to the waste flange 40, by placing the female coupling 38 of the drain line tube 32 over the male flange 40 of the waste tube 42 and rotating the coupling 38 to lock the drain line tube 32 and waste tube 42 together. Following this coupling the attendant then pulls the T-handle 64 so that waste will drain through the drain line tube 32 and into the waste storage tank of the service cart/truck. The waste debris which has fallen into the bag 14 will proceed to the lowest point or base 46 of the bag 14, which is heat sealed against the drain line tube 32. At the junction of the drain line tube 32 and base 46 of bag 14, any waste which has fallen into the interior of the bag 14 will drain into port holes 44 disposed in drain line tube 32 and subsequently to the service cart/truck.

Following the drainage of the waste from the aircraft lavatory, the attendant disconnects coupling 38 allowing it to fall into bag 14. The attendant then closes the waste tube cap 70. Attendant then attaches coupling 50 of refill tube 48 located within bag 14 to the rinse/refill male flange 52 by rotating and thereby locking the tubes together. Still operating within the interior of the bag 14, the attendant then activates switch 54 to start the refill pump in order to replenish the aircraft lavatory tanks with blue solution. Thus, the attendant does not need to lower the bag 14 and remove his/her hands from the gloves 20, 22, which would increase the chances of contamination. Following the filling of the storage tank of aircraft lavatory with blue solution, the attendant disconnects the refill coupling 50 from the flange 52, allowing all spillage and backwash of blue solution to fall into the bag 14, into the drain line tube 32 and subsequently into the tank of the service cart/truck.

It should be understood that while the present invention has been described in detail with respect to specific embodiments thereof, it should not be considered limited to such embodiments but may be used in other ways without departure from the essential features thereof.

What is claimed is:

1. An apparatus to facilitate disposal of waste while preventing waste, chemical solutions and other hazardous materials from contacting persons and objects, the apparatus comprising:
   a receptacle for catching waste;
   first and second openings disposed in said receptacle to allow a user to work within said receptacle;
   a first conduit extending through said receptacle and attached to said receptacle for transporting waste, said first conduit including at least one hole disposed through its circumference, for draining waste from said receptacle into said first conduit; and
   a third opening disposed in said receptacle, whereby said third opening is adapted to accept a second conduit for transporting chemical solutions.

2. An apparatus to facilitate disposal of waste while preventing waste, chemical solutions and other hazardous materials from contacting persons and objects, said apparatus comprising:
   a flexible bag having an open top and a sidewall defining an enclosure;
   first and second orifices disposed in said sidewall of said bag;
   first and second glove members operatively connected to said first and second orifices, whereby a user can place hands into said glove members in order to enter the enclosure of said bag;
   a drain line tube having a proximal end and a distal end, wherein a portion of said drain line tube is attached to said bag;
   a plurality of drain port holes disposed about the circumference of said drain line tube and through said drain line tube;
   a refill tube port disposed in said sidewall of said bag, whereby a refill tube extends through said port; and
   a refill switch operatively connected to said bag.

3. The apparatus of claim 2 wherein said refill switch is disposed within the enclosure of said bag.

4. The apparatus of claim 3 wherein at least a portion of said bag is transparent.

5. The apparatus of claim 4 wherein said bag includes plastic.

6. The apparatus of claim 3 further comprising a first coupling attached to said proximal end of said drain line tube.

7. The apparatus of claim 6 further comprising a second coupling attached to said distal end of said drain line tube.

8. The apparatus of claim 3 wherein said drain line tube includes a flexible material.

9. The apparatus of claim 3 further comprising a first opening in said bag, wherein said drain line tube is disposed within the enclosure of said bag and outside the enclosure of said bag and extends through said first opening, said first opening being disposed substantially opposite said open top of said bag.

10. The apparatus of claim 9 wherein a portion of said bag integral with said first opening is attached to said portion of said drain line tube proximal to said first opening by heat.

11. The apparatus of claim 10 wherein said port holes are disposed in a portion of said drain line tube located within the enclosure of said bag and proximal to said first opening.

12. The apparatus of claim 3 wherein said refill tube is attached to said bag.

13. The apparatus of claim 12 further comprising a first coupling attached to said proximal end of said refill tube.

14. The apparatus of claim 13 further comprising a second coupling attached to said distal end of said refill tube.

15. The apparatus of claim 12 wherein said refill tube includes a flexible material.

16. The apparatus of claim 12, wherein said refill tube is disposed within the enclosure of said bag and outside the enclosure of said bag and extends through said refill tube port.

17. The apparatus of claim 16 wherein a portion of said bag integral with said second opening is attached to said portion of said refill tube proximal to said second opening by heat.

18. A method for emptying waste from an aircraft comprising the steps of:
   surrounding an access panel in an aircraft with a receptacle;
   manipulating and opening said access panel from within said receptacle;
   draining waste materials from a first conduit exposed by opening said access panel; and
   transporting a solution to a second conduit exposed by opening said access panel.

19. A method for the disposal of waste comprising the steps of:
   providing a bag having an open top, glove members attached to and extending to the interior of said bag, a drain line tube having couplings at its proximal and distal ends and having a plurality of port holes disposed about its circumference, and a refill tube having couplings at its proximal and distal ends and having a refill switch operatively connected to a pump;
   placing said open top of said bag in proximity to an access panel of an aircraft lavatory;
   discharging waste from said aircraft lavatory by manipulating couplings within the enclosure of said bag; and
   replenishing blue solution to said aircraft lavatory by manipulating couplings and said switch within the enclosure of said bag.

* * * * *